(No Model.)

A. CAMPBELL.
STOP COCK.

No. 512,537. Patented Jan. 9, 1894.

Witnesses.

Albert Campbell
Inventor
By attys. Earle Seymour

UNITED STATES PATENT OFFICE.

ALBERT CAMPBELL, OF NEW HAVEN, CONNECTICUT.

STOP-COCK.

SPECIFICATION forming part of Letters Patent No. 512,537, dated January 9, 1894.

Application filed April 14, 1893. Serial No. 470,302. (No model.)

*To all whom it may concern:*

Be it known that I, ALBERT CAMPBELL, of New Haven, in the county of New Haven and State of Connecticut, have invented a new Improvement in Stop-Cocks; and I do hereby declare the following, when taken in connection with accompanying drawings and the letters of reference marked thereon, to be a full, clear, and exact description of the same, and which said drawings constitute part of this specification, and represent, in—

Figure 1:
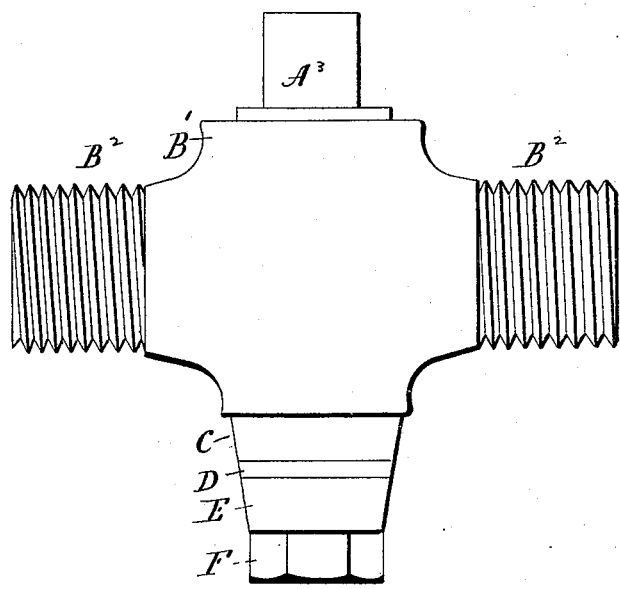
Figure 2:
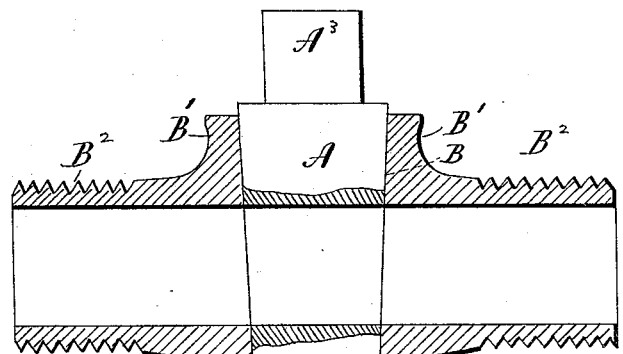
Figure 3:
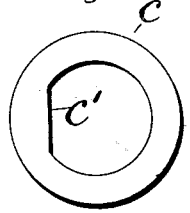
Figure 4:
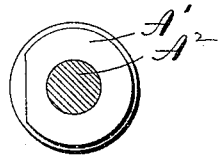

Figure 1, a view in side elevation of a stop-cock constructed in accordance with my invention; Fig. 2, a view thereof in vertical central section; Fig. 3, a detached reverse plan view of the collar; Fig. 4, a similar view of the valve looking at the smaller end thereof.

My invention relates to an improvement in stop-cocks, the object being to produce a simple, compact, durable and effective device, in which the valve is constantly drawn into close relations with its seat by yielding force.

With these ends in view, my invention consists in a stop-cock having certain details of construction and combinations of parts as will be hereinafter described and pointed out in the claim.

In carrying out my invention, I construct the smaller end of the tapering valve A, with a D-shaped shoulder A', and a stem A$^2$, the outer end of which is threaded, the valve being otherwise of ordinary construction, and provided at its opposite end with a squared head A$^3$, for the application of a turn key, and located in a tapering opening B, formed in the body or shell B' of the cock. The said body or shell of the cock is also of usual construction, and furnished with threaded hubs B$^2$, B$^2$ for the attachment of pipes, or to permit any other applications of the device. The said body is provided around the smaller end of its opening B, with a flat seat B$^3$, against which I place a collar C, having a D-shaped opening C', corresponding to the D-shaped shoulder A' of the valve, but just enough larger in diameter than the said shoulder to fit over the same. The outer face of the collar is formed with an annular recess C$^2$, designed to receive the tapering inner end of a rubber cushion D, which has a central perforation for the passage through it of the valve-stem A$^2$. To prevent this cushion from spreading, I prefer to inclose it in a cup-like housing E, fitted over its outer end. A nut F, applied to the threaded end of the stem, bears against the said housing, and places the cushion under tension, whereby the valve is drawn inward into close relations with its seat, and so sustained under the force developed by the consequent effort of the cushion to recover. The valve is thus prevented from working loose. By adjusting the nut it may be made to operate easy or stiff, as found most convenient. Furthermore, the fitting of the cushion into the recess in the collar D, which, as well as the cushion and nut turns with the valve, forms, as it were, a packing for the valve, and prevents any leakage therefrom.

I would have it understood that I do not limit myself to the exact construction herein shown and described, but hold myself at liberty to make such changes and alterations as fairly fall within the spirit and scope of my invention.

I am aware that it is old to employ a spring for holding a conical valve upon its seat and to provide means for adjusting the tension of the spring. I am also aware that it is old to employ in a valve a body of rubber which acts as a compressible packing. I am further aware that it is old in a conical valve to employ a collar interlocking with the valve and bearing against the valve-casing.

Having fully described my invention, what I claim as new, and desire to secure by Letters Patent, is—

In a stop-cock, the combination with a body or shell having a tapering valve-opening, of a tapering valve having its smaller end constructed with a shoulder and a threaded stem, a collar adapted to bear against the said body around the smaller end of the said opening, and to fit over the shoulder of the valve with which it is interlocked, so as to rotate therewith, and having its outer face constructed with an annular recess, a rubber cushion adapted to fit into the said recess in the collar, and having a central perforation to receive the said stem, a nut applied to the threaded end of the stem to subject the cushion to compression, and a housing fitted over the outer end of the cushion to prevent it from spreading and bearing against the inner face of the nut which acts through the housing to compress the cushion, substantially as described.

In testimony whereof I have signed this specification in the presence of two subscribing witnesses.

ALBERT CAMPBELL.

Witnesses:
FRED C. EARLE,
J. H. SHUMWAY.